United States Patent [19]
Castleman et al.

[11] Patent Number: 5,508,691
[45] Date of Patent: Apr. 16, 1996

[54] SELF-CONTAINED ELECTRONIC LOCK WITH CHANGEABLE MASTER AND SLAVE CODES

[75] Inventors: Neal J. Castleman, Malibu; Roger Lynx, Los Angeles, both of Calif.

[73] Assignee: Lynx Systems, Inc., Santa Monica, Calif.

[21] Appl. No.: 901,892

[22] Filed: Jun. 22, 1992

[51] Int. Cl.⁶ ..................................................... G06F 7/04
[52] U.S. Cl. ............... 340/825.31; 361/172; 340/825.32; 235/382.5
[58] Field of Search ............... 340/825.31, 825.32, 340/825.34; 361/172; 235/382.5

[56] References Cited

U.S. PATENT DOCUMENTS

| | | | |
|---|---|---|---|
| 3,821,704 | 6/1974 | Sabsay | 340/825.31 |
| 4,392,133 | 7/1983 | Lundgren | 340/825.31 |
| 4,519,228 | 5/1985 | Sornes | 340/825.31 |
| 4,742,426 | 5/1988 | Lavelle | 340/825.31 |

*Primary Examiner*—Michael Horabik
*Attorney, Agent, or Firm*—Ashen & Lippman

[57] ABSTRACT

An erasable circuit provides a nonvolatile memory for holding key codes in at least two memory locations. At least one of these locations is a master key code address. "Master key" here means a key that can command a lock to store a key code or to erase a stored key code. An input device makes electrical connection to an electronic key—such as a ROM key—to receive from the key an electronic code that is in essence unique to that key. The lock also has provision for comparing such a received code with the contents of each of the address locations, and it responds to the comparison by performing a lock-management function. Such functions include opening or closing a lock, changing the state of a key switch, rejecting a key, and validating or invalidating a key—particularly including a master key—by physically changing the contents of the nonvolatile memory. Perceptible signals identify the lock-management function for human users. For ordinary lock applications, operation of the lock is preferably induced by a key engagement that is momentary; for vehicular and various other applications, however, operation may be preferably initiated by an engagement as protracted as operation of the vehicle etc.

31 Claims, 7 Drawing Sheets

SELF-CONTAINED ELECTRONIC LOCK WITH CHANGEABLE MASTER AND SLAVE CODES

RELATED PATENT DOCUMENT

A related document is U.S. utility-patent application Ser. 07/902,681, filed in the United States Patent and Trademark Office on the same date as this document and entitled "IMPLEMENT FOR CONTROLLING AN ELECTRONIC LOCK MECHANISM AND METHOD OF USING AND OF PRODUCING SUCH AN IMPLEMENT", and now issued on Jun. 21, 1994, as U.S. Pat. No. 5,322,992.

1. Field of the Invention

The present invention relates generally to a self-contained electronically operated lock which may be programmed to open upon presentation of any one of a number of electronic key devices, each of which contains a key code; and, more particularly, to such a lock that has improved versatility in the management of codes that are authorized to open the lock.

For present purposes the key code in each electronic key device is preferably substantially unique: the meaning of this phrase will be presented below.

2. Background of the Invention

Electronic locks which can be made either responsive or nonresponsive to keys containing unique electronic codes have been previously known. U.S. Pat. No. 4,392,133 issued Jul. 5, 1983, to Lundgren (as well as corresponding European patents issued earlier) discloses an electronic lock which a person can partially reprogram at will with the aid of a "control key".

Each of Lundgren's "control keys", and also each of a plurality of other Lundgren keys called "opening keys", contains an electronic code. To program the lock to open in response to a particular "opening key", that key and the "control key" are presented to the lock concurrently; thus, the "control key" is used to validate or authenticate each of the "opening keys" that will actually be used to open the lock.

In this way one or several "opening keys" can be authorized to open the lock, the corresponding electronic codes being stored electronically within the lock. A particular "opening key" can also be removed from the authorized list (hereinafter, "deauthorized") by presenting it to the lock in conjunction with two, rather than one, presentations of the "control key".

Modern semiconductor technology makes possible the provision of electronic keys that can each carry one of an essentially unlimited number of electronic key codes—each code being unique, or substantially so. For example, the DS 2400 circuit device manufactured by Dallas Semiconductors, Inc., has a numerical capacity equal to the fourteenth power of ten, or one hundred trillion, and the devices are manufactured in such a way that no two of them hold the same number.

Thus the numerical range of ROMs now on the market exceeds the population of the earth by several orders of magnitude; hence it is entirely practical to make every ROM key code literally unique. Nevertheless, it is not strictly speaking necessary to do so, inasmuch as the probability of an unauthorized key reaching any given lock due to duplicate or multiplicate use of key codes can be kept negligibly small even without strict uniqueness.

For purposes of the present document, the phrase "substantially unique" is used to encompass use of key codes that are not literally unique but whose numerical range as a practical matter is high enough to render negligible the probability of coincidental nondeliberate key-to-lock matches. (Lundgren's invention, however, did not employ a Dallas Semiconductors device.)

Although the Lundgren lock-and-key system is very ingenious and useful, and has been publicly known for some ten years, the present inventors have recognized that it does have limitations. First, if a Lundgren "control key" is lost or destroyed, the reprogrammability of any lock that recognizes that "control key" is rendered impossible.

This is undesirable in event any of the "opening keys" already authorized for use in any such lock must be deauthorized, or any other "opening key" must be authorized. It is believed that deauthorization of some "opening keys" and authorization of others can be essential under many circumstances.

For example, a previously authorized "opening key" may be physically lost or may be known to have fallen into the possession of an unauthorized person; or a person who owns such a key may be no longer authorized to gain access to a facility or apparatus controlled by any such lock. (The concept of ownership of a key by a person, as contrasted with essentially permanent association of a key with a facility or apparatus, will be explained in the following section.)

Similarly authorization of an "opening key" not previously authorized may be required because it is desired to replace one previously lost or misappropriated. Further yet, some person not previously authorized may become authorized to accede to a facility or apparatus controlled by a certain lock.

The resulting cost, inconvenience and delay in such circumstances can be uneconomically high. All such locks must be physically removed, and generally speaking removed by destructive techniques (since they cannot be unlocked).

Another drawback of the Lundgren lock is that it accepts only a single "control key". Thus if the security manager of a business or the owner of a home is absent and is carrying the "control key" no deauthorization or new authorization is possible.

Still a further disadvantage of the Lundgren system—but closely related to those already mentioned—is that a lock cannot be reprogrammed to accept a new "control key"; and electronic keys are made no two alike. Thus it is impossible for a code of some replacement "control key" to be programmed into the lock.

Accordingly if the owner of a "control key" for a lock in a given business establishment moves, for example, to a new employment, he would be unable to take the electronic "control key" for that lock with him. The "control key" would have to remain with the lock.

This restriction would constrain electronic keys to the present system, used with mechanical keys, in which each individual must carry many keys about. As will shortly be seen, such a constraint is undesirable.

It is believed that these handicaps are significant. If they have come to the attention of people skilled in the art, these limitations may account for total absence of commercial activity in the Lundgren lock—despite the passage of a decade since its introduction.

In a word, the Lundgren system is not only ingenious but also—beyond question—very usable and beneficial, but still amenable to important refinement, and perhaps not heretofore implemented in a form that, is optimally practical. The present inventors are not aware of any suggestion, during that decade, of any self-contained electronic lock-and-key system in which these problems have been overcome.

The Lundgren invention takes the form of a system of state-oriented electronics, including a shift register and a ROM (nonvolatile, unchangeable read-only memory) whose outputs are compared, and also including flipflops and logic elements interwired to perform comparisons, etc. and to cause the apparatus to proceed from each operation to the next. His system also includes a RAM (volatile random-access memory), which is always electrically energized, to hold the authorized "opening key" codes.

In the Lundgren system, engaging a "control key" with a lock once, and then engaging an "opening key" with the lock, induces the lock to store or enter the code from that "opening key" into one of the RAM locations in the lock. Engaging a "control key" twice in succession, and then an "opening key", induces the lock to clear or delete the corresponding "opening key" code from the lock—if that code is already in the lock. (These procedures are set forth in the Lundgren patent at column 2, lines 56 and 57, and column 3, lines 11 through 16, respectively.) Inserting a "control key" some four times clears all "opening key" codes from the lock.

Perhaps there may exist more-elaborate, more-expensive systems—requiring frequent attention of skilled personnel for proper operation and maintenance—that may provide partial solutions to the awkwardnesses discussed above. Such systems would be prohibitive in the context of controlling individual locks for modest facilities that each have a small number (e.g., one to twenty) locks.

Finally, equipment previously available in the marketplace for use in the physical step of actually identifying authorized people has generally been unduly expensive for use in most homes and even most small businesses. Generally electromagnetic readers, optical readers, keypads, etc. have been employed; all these are relatively costly, and in addition most are subject to mechanical breakdown that is relatively (as compared with lock mechanisms in general) frequent, and expensive to correct.

In any event, heretofore such systems evidently have not been associated with devices such as the Lundgren lock, or implemented effectively—at least in an economic sense—in the form of other self-contained systems. Thus the benefits of known access-control systems have not been made available to the general public and particularly to homeowners, operators of small businesses, etc.

SUMMARY OF THE DISCLOSURE

At the outset, the present inventors contemplate that electronic keys, unlike mechanical keys, predominantly will come to belong to, or be associated with, individuals (rather than to or with facilities or apparatuses). In such an environment each individual carries only a small number (such as one) of electronic keys.

Locks correspondingly require reprogramming with each change of staff in businesses and institutions, and with each change of residents in homes. They also require reprogramming with each change of ownership of equipment such as vehicles and computers, etc.

The future predominance of such customs may be foretold in the fact that already the only electronic ROM key known to be on the market is deliberately made (a) unchangeable and (b) no two alike. At all events these expectations are one basis for the above-noted concern over deauthorization of previously authorized keys and authorization of new ones.

A self-contained electronic lock in accordance with the present invention permits not only the reprogramming of opening keys—or, as we call them, "slave keys", but of control keys or "master keys" as well. For purposes of this document including the appended claims, the phrase "master key" means a key that enables changing the contents of a lock memory, to make different key code(s) open the lock, and so is analogous to Lundgren's "control key". Any one of a multiplicity of outwardly identical key devices, each of which electronically stores a substantially unique number, may be used either as a "master key" or as an opening or "slave" key.

A key that is a master in some locks may be a slave in others, and conversely. Preferably each lock holds more than one master key code.

As will be seen, despite a very general conceptual correspondence between, on one hand, the control and opening keys of Lundgren and, on the other hand, the master and slave keys of the present invention, important and beneficial differences are present. That is, our master and slave keys are identical in neither structure nor use to Lundgren's control and opening keys.

In preferred embodiments of our invention, all authorized key codes are stored or held within the lock in an EEPROMs, which is nonvolatile and hence retains the codes even when the associated circuitry is not energized. All key codes, both master and slave, are installed in the EEPROMS by following a prescribed procedure, and may also be erased or removed by following a prescribed procedure.

A key code of a master key may be called, in shorthand form, a "master code"; and a memory address where such a code is installed may be similarly denoted a "master address", "master memory area" or "master location" etc. Similarly a key code of a slave key may be designated a "slave code"; and a storage position for such a code may be called a "slave address", "slave location", and so forth.

As can now be appreciated, even in the broad or general form just set forth, our invention overcomes all the limitations of the Lundgren system—thereby for the first time providing a self-contained electronic lock that is fully practical, and of a generation beyond the Lundgren lock.

In particular, because the system permits erasure of master codes, and also preferably holds not just one but a plurality of master keys, it obviates all the above-described problems of lost master keys, the desirability of having two or more authorized master-key users, absent security personnel, changes of personnel, etc. Thus if one authorized master key has been lost or its owner changes employments or homes etc., another master key may be used to program in the code of another key to serve as master.

In addition the invention provides an important advantage in that—with certain modifications that will be evident to those skilled in the art, in view of this comment—high-security facilities or equipment can be made accessible only when plural different keys are presented in sequence within a short interval. Similarly a lock can be made reprogrammed only when plural different master keys are presented in sequence during a short interval.

The invention also operates to make the important benefits of electronic-lock systems fully available and optimally economic for the first time in homes, small businesses and other modest facilities.

In the now-preferred form of our invention, state-oriented electronics are not employed. Rather, all logical operations are carried out by a programmed microcontroller or microprocessor. Accordingly the procedures for installing or erasing key codes, or for opening or refusing opening of the associated lock, are all defined by a permanent program or instruction set that is stored in a ROM which is a part of the microcontroller.

All of the foregoing operational principles and advantages of the present invention will be more fully appreciated upon consideration of the following detailed description, with reference to the appended drawings, of which:

DESCRIPTION OF PREFERRED EMBODIMENTS

Figure 1:
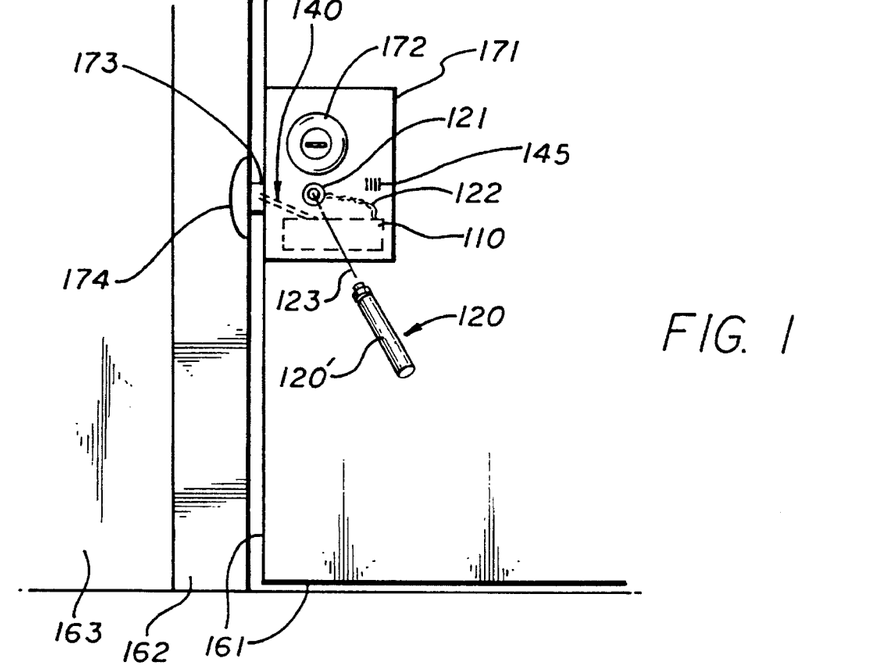
FIG. 1 is a perspective view of a representative lock according to the present invention, in the context of a door and a door jamb—the internal casing of the lock (containing a lock electronics module) being shown in the phantom line.

FIG. 1 shows a lock mounted in a door 161 as part of a latch assembly 171-172-173—which assembly optionally includes a generally conventional doorknob 172. The latch tongue 173 is controlled by a solenoid, electrical motor or the like 140 in a generally conventional fashion, and engages a jamb-mounted strike 174—which may be an ordinary passive strike or a conventional power strike that carries electricity from the wall 163 and jamb 162 to the lock 110-121-122-140-145-173, as preferred.

The solenoid, motor etc., 140 however, is actuated by an electronics module 110 that is held within the lock, in a manner described in this document. A receptacle 121 mounted in the face 171 of the doorknob and latch assembly, and having electrical contacts (analogous to those at 226, 227 in FIG. 1B), is specially configured to receive and communicate electrically with an electronic key 120—and also is operatively connected as through wires 122 to the working elements of the electronics module 110. In this embodiment the receptacle 121 is preferably configured to receive and communicate with the key 120 momentarily.

Through those wires 122 and receptacle contacts, and through mating contacts (analogous to those at 228, 229 in FIG. 1B) on the key 120, the electronics module 110 in the lock reads a code number from a ROM in the key 120 and stores the code number in a RAM inside the electronics module 110.

Power to the electronics module 110 may be supplied through a power strike as suggested above, or through wires running through or on the secured side (i.e., the back) of the door 161, or (in the most highly preferred embodiments) from a battery inside or associated with the electronics module 110.

In the embodiment of the invention on which the present document focuses most emphatically, the many functions that result from placing a key 120 into electrical communication with the electronics module 110 are all obtained by insertion of the key 120 into the receptacle 121 momentarily. Such momentary usage is described in detail in the related patent document identified above.

Momentary insertion, however, is by no means required in practice of the present invention. First, other embodiments in which the key is inserted for a period of time that is within some prescribed range may be substituted straightforwardly for embodiments that are actuated by insertion momentarily.

Secondly, our invention contemplates many applications in which the key is inserted into, and left inserted in, the receptacle for the entire period during which access is desired. Such applications include many access environments in which it is desirable to confirm the physical presence of the key-carrying person (or at least of that person's key) continuously during the access interval—for example:

- operation of vehicles, dangerous heavy machinery, secure computer systems, or communication equipment (particularly where large numbers of people or valuable resources may be influenced by information communicated);

- maintenance of safety equipment, particularly where interruption of service of the equipment is required for maintenance; or

- access to cabinets or safes containing jewelry, cash or other physically valuable articles.

Accordingly throughout this document it is to be understood that reference to momentary insertion is intended as exemplary of one preferred embodiment, and that other insertion intervals are contemplated as most sensibly dictated by the character of the application at hand. This understanding is particularly applicable in regard to the use of slave keys for actual gaining of access to guarded facilities or equipment, but also—to a somewhat more qualified extent—even in regard to the use of master keys for reprogramming functions.

Figure 1A:
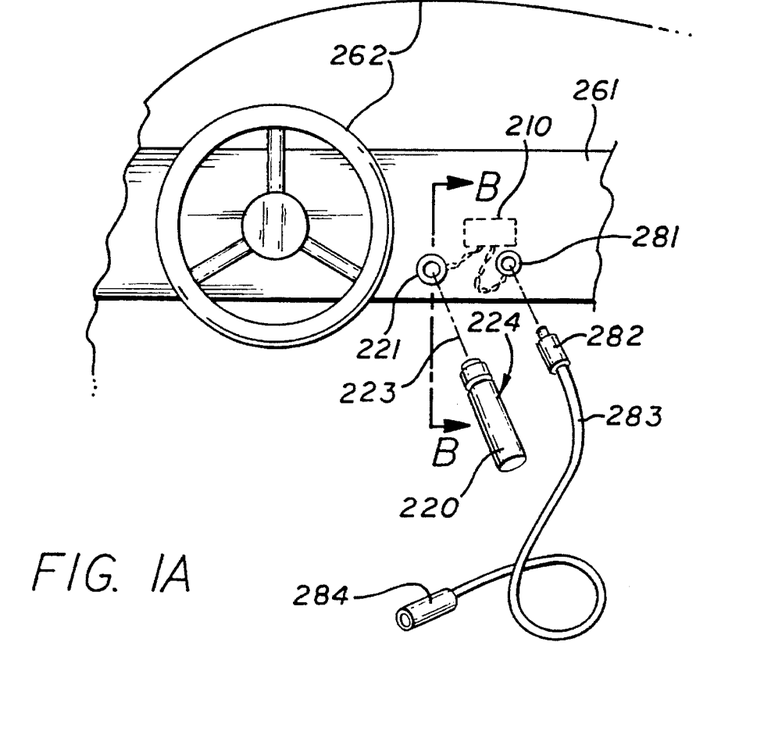
FIG. 1A is a like view of a representative lock of a "hold in" or protracted-engagement type, in the context of an ignition switch or other operational-access control system for a vehicle or other equipment.
Figure 1B:
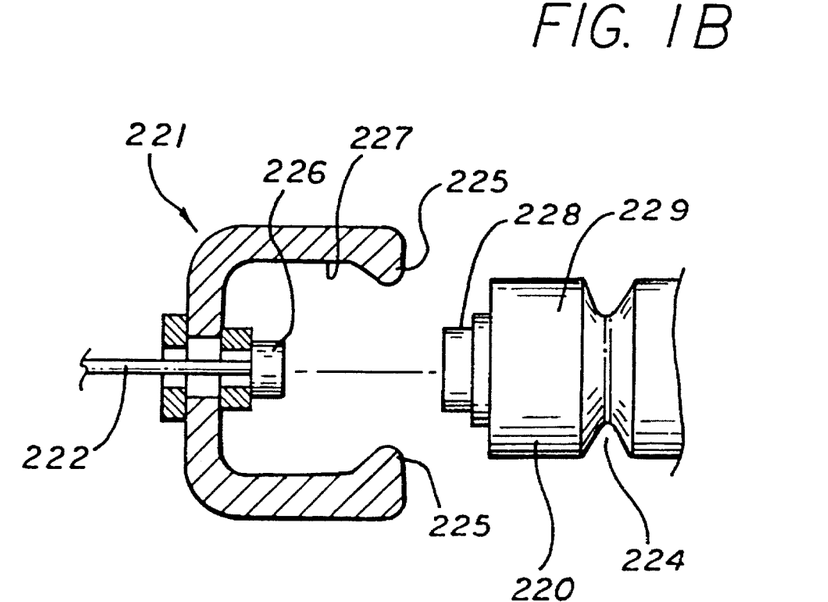
FIG. 1B is a partial cross-sectional view of a portion of the FIG. 1A lock, taken along the line B—B of FIG. 1A, and also shows (but not in section) the mating tip of a key.

Thus FIGS. 1A and 1B show a preferred embodiment of the invention for use with vehicles and other types of systems in which it is deemed desirable to require the continuous presence of an authorized operator (or key). Here the receptacle 221 is mounted in a position convenient to the operating position normally occupied by the operator during use of the system—for instance, in the dashboard 261 of a car.

The receptacle 221 in this embodiment preferably includes flexible retainers or detents 227 to engage one or more mating elements 224 of a key 220—or if preferred to firmly, frictionally engage a featureless surface 120' (FIG. 1) of an electronically similar key 120. By any such preferred means a key 120, 220 is retained in the lock receptacle 221 until a person removes it; and the electronics module 210 of the lock is programmed to control the power system in response to key/lock engagement that is substantially continuous rather than momentary.

As mentioned earlier, it is contemplated that each person will carry not many but perhaps only one or a very few keys, and that each person's key or few keys will be programmed into all the locks which that person is authorized to use. Hence it may be, for example, that an operator of a vehicle 261–262 or other equipment may wish to use that person's key—during operation of that equipment—to gain access to some other apparatus which requires use of that key: a cellular telephone, portable computer, toolbox, briefcase, or any of a great number of other commonly-locked articles.

To facilitate such access without interrupting use of the vehicle 261–262, etc., the power-control lock in this embodiment may include an optional code-relaying jack 281. To this jack 281 may be attached an electrical pigtail or umbilicus 282–284.

The umbilicus, in turn, terminates in a connector 284 that has the same configuration as the key contacts—and so can be engaged with the lock of other apparatus such as described in the preceding paragraph. Alternatively, or in addition, the ignition lock can be programmed to tolerate a brief period of removal of the key for use in such other apparatus.

Figure 1C:
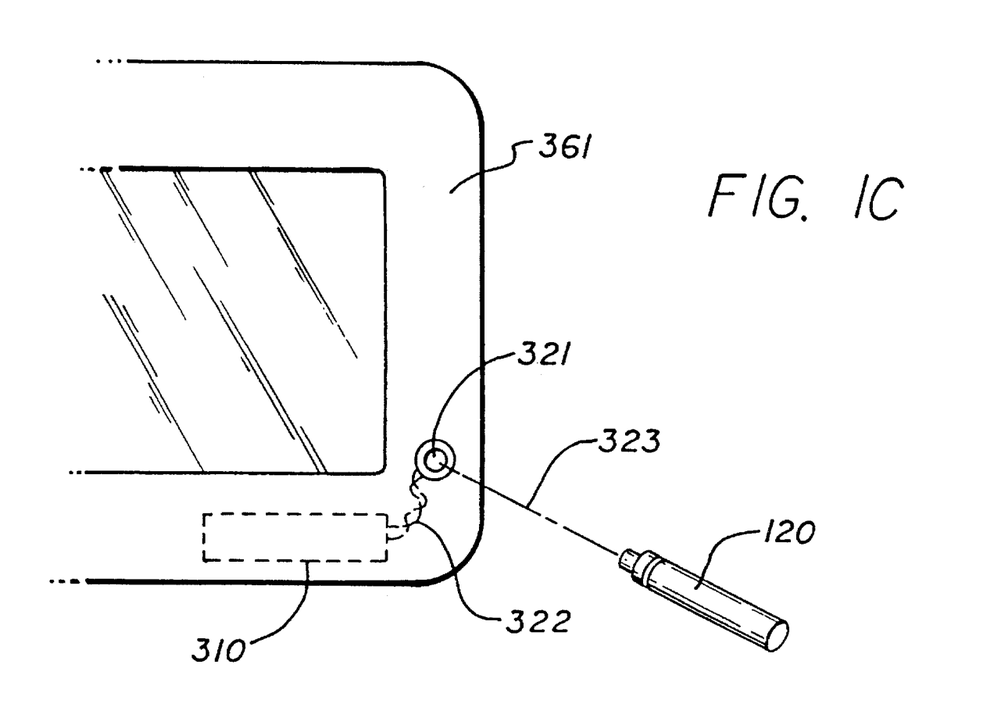
FIG. 1C is a like view but of a representative lock or device of the key-switch type, in the context of a computer-access switch.

In FIG. 1C can be seen still another similar key receptacle 321, this one being preferably like that of FIG. 1 in configuration, and thus preferably adapted for momentary contact and withdrawal. Here, however, the receptacle 321 and the associated electronics module 310 are mounted in a control panel of (or otherwise conveniently to) a monitor 361 or a central processing unit of a computer or other controlled-access host apparatus, and are interconnected—most typically electrically—to control operation of the computer or other host apparatus.

This electronics module 310 is programmed to toggle, or alternate, the control state of the lock between open and closed conditions—in response to each momentary insertion. Such a system is familiarly known as a "key switch".

Thus each time an authorized key 120 is engaged with the lock receptacle 321, if the lock is open (that is, if the switch controlled by the lock is allowing power to flow to the computer, or is otherwise allowing operation of the computer monitor 361 and attached computer), the electronics module 310 will close the lock (terminate operation of the computer). Conversely, if the lock is closed the electronics module will open it.

Figure 2:
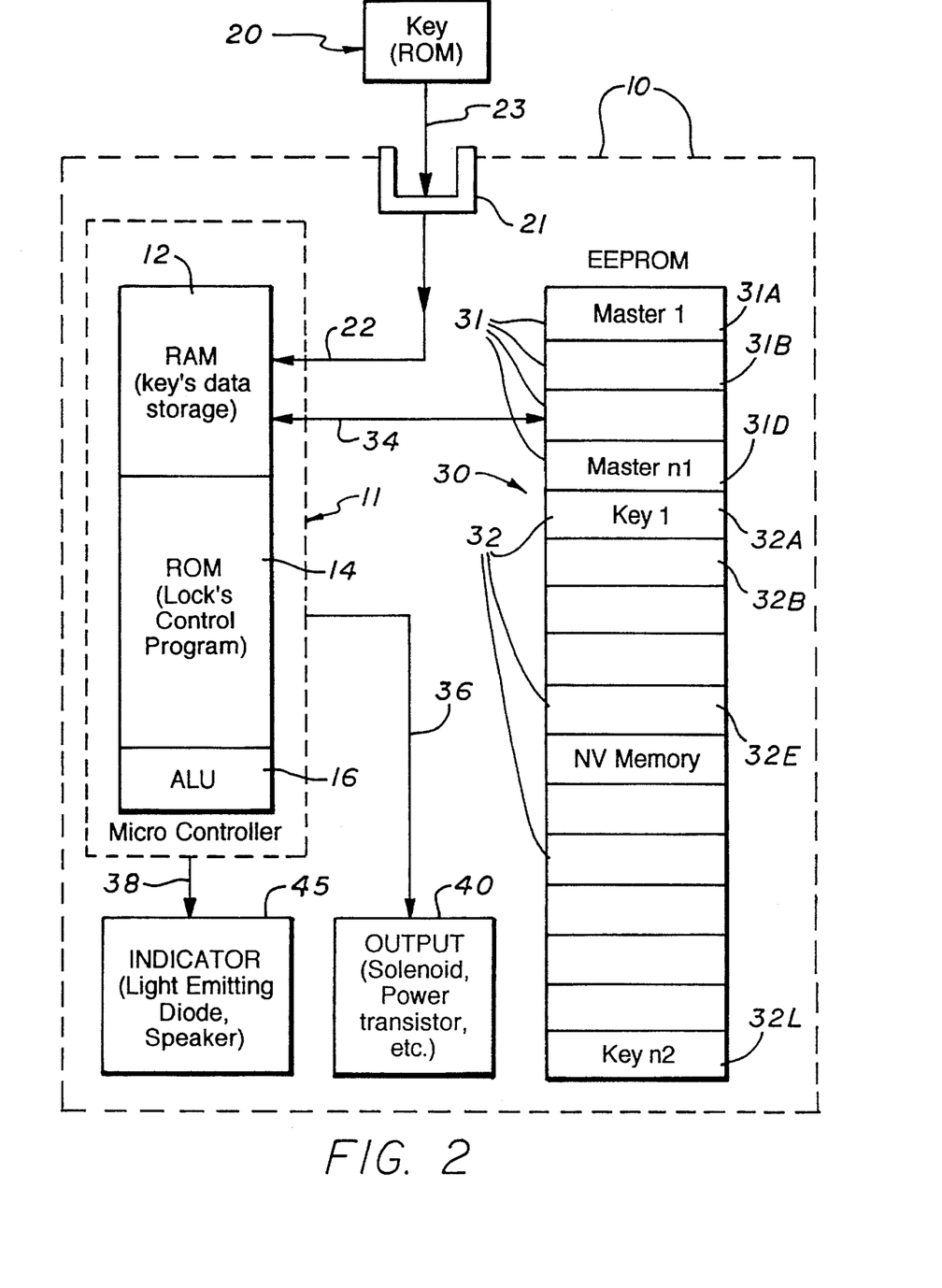
FIG. 2 is a schematic diagram, partly in block form, of the circuitry of an electronic lock in accordance with the presently preferred form of the invention.

Referring now to FIG. 2, a microprocessor or microcontroller 10 (corresponding generally to the electronics physical modules 110, 210, 310 discussed above) includes a random-access memory or RAM 12, a read-only memory or ROM 14, and an arithmetic and logic unit or ALU 16. The ROM has been permanently loaded with a program suitable for carrying out the functions of the lock in accordance with the invention. That program is described in some detail by the flow charts of FIGS. 3 through 6, inclusive.

An electrically erasable read only memory, or EEPROM, 30 provides storage for any and all key codes that may have been previously stored within the lock. We prefer to reserve specified memory positions 31 in advance (as shown in FIG. 2) for some number n1 of master keys, and other positions 32 for some other number n2 of slave keys.

Alternative systems, however, are usable—though perhaps not as efficient—that instead flag or tag whichever memory positions 31, 32 actually hold master codes. Such alternative systems have the advantage of rendering even more versatile the allocation of available memory space as between master and slave codes—and thus rendering more versatile the usage of the device as between the number of people (or at least keys) authorized to program codes into the lock and the number of people (or keys) authorized to merely open it.

For purposes of such alternative systems, the lock may be programmed for substantially automatically selecting a master key code location in the erasable memory; and, if that location is not already reserved for a master key code, for substantially automatically reserving that location for a master key code.

Still other alternative embodiments of our invention provide a hierarchy of codes. In such systems, certain master keys can authorize or deauthorize other master keys that are lower or at the same level (or if desired only lower) in the hierarchy, but not higher master keys, etc.—again adding to the versatility of the system.

All such alternative embodiments or systems, however, are also likely to have the drawback of requiring more-complex operating procedures. As will be understood, engineering tradeoffs between these characteristics (versatility and complexity) can be selected to obtain best enjoyment of the benefits of the invention for each different environment.

Such variations, however, need not restrict the general usability of substantially the same keys 120 (or e.g. keys 220 with minor mechanical variations 224) in all locks. Thus operational preferences of the managers of various facilities and the designers of various types of equipment are substantially internal to locks—but with some effect on the procedures for use of locks by (for the most part) master-key users only—and need not interfere with the general arrangement in which each person carries only one or a few keys.

In each of the various preferred embodiments introduced in this document, a separate key 20 contains its own ROM which preferably holds a substantially unique number within the hundred-trillion range mentioned above. As indicated by arrow 23, the key 20 may be placed into electrical communication with the RAM 12 of the microcontroller 10.

This engagement corresponds to insertion of the key 120, 220 of FIGS. 1, 1A, 1B and 1C into the receptacle 121, 221, 321. With the exception of the key 20 all the apparatus shown in FIG. 2 is within (or in close association with) the lock 110-121-122-140-145-173 or its equivalent (e.g., 210-221, 310-321) in other environments.

As indicated by the bidirectional arrow 34 between the RAM and the EEPROM 30, the key code newly received from key 20 becomes the subject of bidirectional communication between the RAM and the EEPROM. The nature of those communications, and the end result achieved from them, are determined by the program stored in the ROM 14.

In general, the presentation of every key to the lock causes some kind of perceptible output. For example, if the lock is to be opened, an opening signal is sent on line 36 from ROM 14 to an output device 40, which may be a solenoid, a power transistor, or the like—corresponding to the mechanical actuation symbolized generally by the broken line 140 in FIG. 1.

Whether or not the key is acceptable to the lock, a signal is also sent on line 38 to an indicator 45, typically a light-emitting diode or a loudspeaker. That device generates a perceptible signal in a distinctive form to indicate whether the lock accepted the key.

If desired, a suitable grillwork or other port 145 (FIG. 1) can be provided in the assembly faceplate 171, dashboard 261, etc. for exit of visible or audible signals from the indicator 45. In many installations, however, acoustic signals may be generated by vibration of the panel 171, 261 etc. itself, or transmitted through the panel.

The various functions performed by the lock will now be outlined. In the following discussion it will be assumed that the indicator 45 is a loudspeaker which generates appropriate distinctive acoustic signals or tones to convey to an operator or would-be operator of the lock what has transpired inside the lock circuitry.

Throughout this document the phrase "lock-management function" encompasses both access-control operations (such as releasing a latch, or allowing a person to use a computer or a motor vehicle) and lock-memory operations (such as erasing the contents of a key code address location, or placing a new key code in a location).

LOCK-MANAGEMENT FUNCTIONS

ESTABLISHING (PROGRAMMING) A MASTER KEY:

The first momentary touch of any key to a virgin lock will cause that key to become a master key. (For purposes of this document, a "virgin lock" is defined as one which has no key codes in the EEPROM—either because there never were any, or because any that were previously there have all been erased. This latter portion of the definition of course departs from the customary usage.) The apparatus responds by installing the key code of the new master key in one of the master key code memory addresses or "master locations".

To indicate that a master code has been installed, the indicator generates a distinctive signal. Here we prefer that the signal consist of two tones each about 0.1 second in duration, with a pause of about 0.1 second between them.

As will be seen, this particular signal pattern forms part of a hierarchy of signals which conveys very clearly to a person who wishes to open the lock what interpretation the programmed lock has made of the particular key presentation. The hierarchy of signal patterns corresponds to a hierarchy of key presentations, and of corresponding lock-management function.

Thus although the tone patterns described throughout this document are only exemplary in one sense—namely, in the sense that our invention is not only viable but also very powerful and useful even if used with different signals—in another sense the patterns we have chosen are believed to be a significant part of our inventive contribution. One of the reasons our novel lock is optimally useful is that it makes very clear to operators and would-be operators of the lock what is occurring.

Insertion of a master key at this stage is only a programming step. We therefore prefer to instruct the microprocessor to refrain from opening the lock in response.

Since the preferred embodiment of the circuit has two memory locations for master keys, the first momentary touch of a second key induces installation of its key code too in the master memory area. Again, two tones—each of 0.1 second duration—indicate that a new master has been made; but the lock does not open.

If the first key is applied to the lock twice before any other key is applied, then the apparatus responds by installing that same key's code in the second master key code memory location. There will then in fact be only a single master key, with its code filling both master locations.

If, however, a master key is applied to the lock after there are no more empty spaces in the master key code memory locations, in our preferred embodiment the resulting operation is quite different from that described above. This aspect of the preferred embodiment will be detailed in the following sections of this document.

ADDING (PROGRAMMING) A SLAVE KEY:

When all of the master key code memory locations are filled, a new key may be programmed into the lock as a "slave key". The procedure is to first momentarily touch the lock with a master key. The lock responds by opening for five seconds, and it also generates a distinctive signal—for example, in our preferred embodiment, a tone of five-second duration.

Then, and within the five-second continuous tone period, the operator should momentarily (again, please note the earlier discussion of this point) engage the new key with the lock. The apparatus responds by programming the new key into the lock—i.e., by storing that key's code in one (typically the first one) of the available slave key memory locations in EEPROM.

The lock then acknowledges the validation of the new key by generating a distinctive signal—and here we prefer a tone of 0.1 second duration. Again, because this is purely a programming step the lock does not open.

The embodiment now illustrated contains fourteen slave key code memory locations, or "slave locations", permitting the use of up to fourteen slave keys. If the fourteen positions are already full, recognition of a new key is refused, and the lock so indicates by generating a distinctive signal—here preferably a series of three tones, each 0.1 second long, separated by pauses of equal duration.

If, however, the operator presents to the lock a key that has already been programmed into the lock as a slave key, then the resulting operation will depart from that just described. The next section details that resulting operation.

OPENING THE LOCK:

The procedure to open the lock is to touch it momentarily with a key that is already programmed into the lock—i.e., its key code has already been temporarily stored either in one of the master locations or in one of the slave locations in the EEPROM. The lock then responds (except in the special cases of preliminary programming described above) by opening.

If the key is a master key, preferably the lock generates a five-second tone. If the key is a slave key, preferably the lock generates a 0.1 second tone.

For key-switch applications—as distinguished from door locks or the like—the output state is toggled between open and closed states upon each insertion of a valid key. For operator-presence applications, such as vehicle control and the others enumerated earlier, the output state remains "open" (i.e., access permitted) as long as the key remains inserted, and when the key is removed the output state changes to "closed".

DEAUTHORIZING A PARTICULAR SLAVE KEY:

A particular slave key may be erased from the lock's memory by the following procedure. A master key is touched to the lock, causing the apparatus to generate a five-second tone and also to open the lock.

During the five-second duration of the tone the slave key to be deauthorized is touched to the lock once. The erasure is confirmed by a special distinctive signal: preferably two tones—the first a relatively long one of 0.7-second duration, then a pause of 0.1 second, and then a second tone of 0.1-second duration. This special signal warns or confirms to the operator that the slave key in hand has just been deauthorized, not authorized.

DEAUTHORIZING ALL SLAVE KEYS, ONLY:

A master key is touched to the lock twice within a five-second period. This results in the erasure from the EEPROM of all key codes except the codes for the master keys.

ERASING ALL KEYS INCLUDING ALL MASTER KEYS:

To erase all keys including all master keys, the master key that is being used to induce the erasing must be engaged with the lock three times. After it has been applied to the lock once, it must then be engaged a second time within the period of the five-second tone generated in response to the first touching—and then a third time during the period of the five-second tone generated in response to the second engagement.

This procedure causes all key codes to be erased from the EEPROM. The total erasure is acknowledge by a series of three 0.1-second tones with 0.1-second separations.

RESPONDING WHEN A KEY IS TOUCHED TO THE LOCK

Some of the foregoing subsections can now be summarized as follows. If a key is touched to a virgin lock, the key becomes a master, and is acknowledged by two 0.1-second tones. The lock does not open.

If the lock, though storing one master, still has capacity for another master in the EEPROM, the key becomes a master and is acknowledged in the same manner. The lock does not open.

If all the master locations are filled and the key is a previously programmed or validated key, either master or slave, the lock opens. If it is a master, a five-second tone is generated, and if it is a slave, a tone of 0.1 second is generated.

If the key has not been programmed into the lock's memory, and is not preceded by the touching of a master key, the lock does not open. Instead it generates a series of three 0.1-second tones separated by 0.1-second pauses.

As has been seen, in our preferred embodiment the use of a master key to control operation of the lock relies upon insertions of a master key—and sometimes a slave key— into the lock in uninterrupted sequence. By "uninterrupted" is meant that no other events intervene.

For example, if two or more insertions of a master key are specified, no insertions of other keys (or objects) should be performed between or among the required number of insertions of the master, etc. It will be understood that other embodiments can instead be made to tolerate or even to require such intervening insertions.

Also it is necessary to provide some sort of guard intervals to prevent the system from responding as if a master key has been inserted some plural number of times (e.g., three times) when the user of the key only intends to insert it some smaller number of times (e.g., once)—if the user's manipulation of the key relative to the lock receptacle is not steady. This may be particularly important for very young, very elderly, and infirm users, but also users who are handicapped by simultaneously holding or manipulating other articles at the same time—or by poor lighting, insecure footing and the like at the site of use.

In our preferred embodiment, in effect the desired masterkey guard intervals are obtained without any added special provision. This is so because of the time required for certain operations of the programmed circuit.

Thus the system requires some time to provide the "wake-up call" (mentioned earlier) when a master key is first inserted, and to then generate the first extended tone. This allows the user ample time to withdraw and prepare to reinsert the key—which is to be done during that first extended tone.

Similarly after the user reinserts the key the system takes some second time period to register the fact that a master key has been inserted again and then to initiate the second extended tone; any required additional reinsertion is to be performed during the generation of the second extended tone. This second time period too serves amply as a guard interval for the user's subsequent withdrawal and reinsertion; etc.

DESCRIPTION OF FLOW CHARTS

Figure 3:
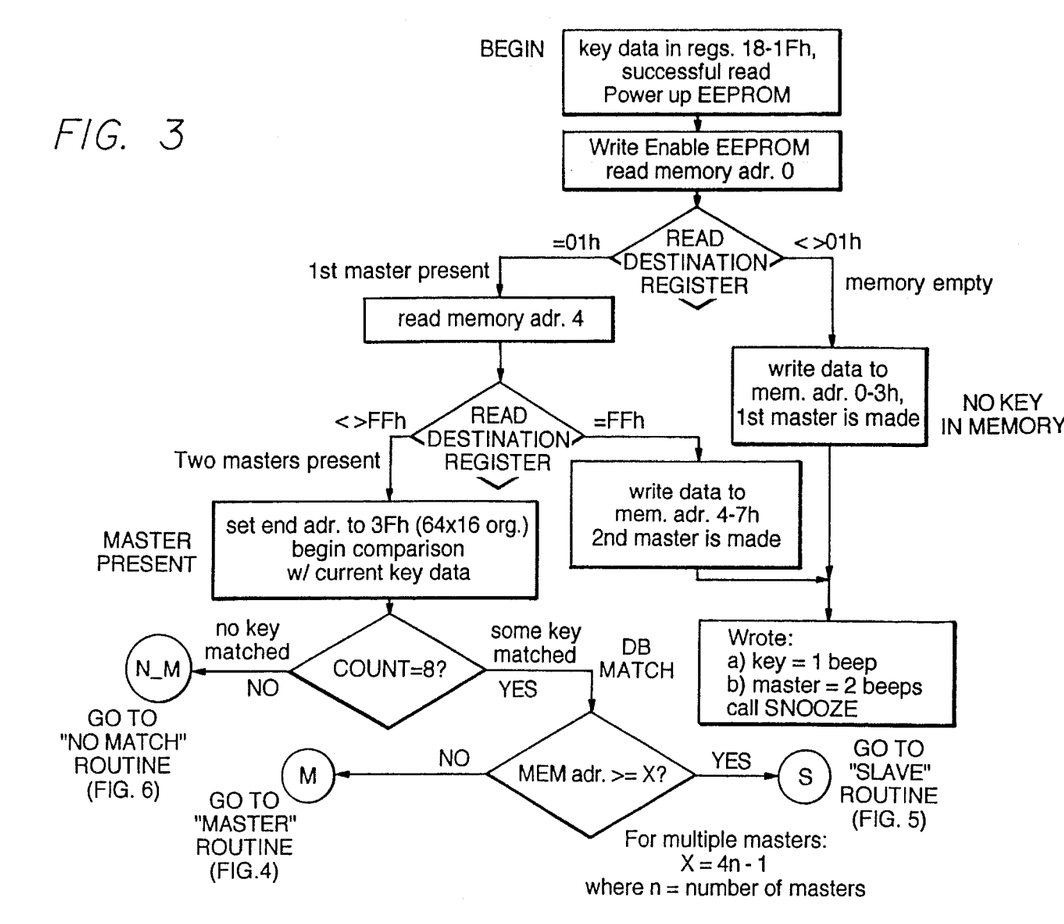
FIG. 3 is a flow chart indicating how the lock responds to the electronic code of a newly presented key to determine whether a new master key code should be stored in the lock.

FIG. 3 is a flow chart indicating how the lock responds to the electronic code of a newly presented key to determine whether or not a new master code should be stored in the lock. In the illustrated embodiment the data are processed in the hexadecimal, or base 16, code.

For applications of our invention in which the lock is door-mounted, as illustrated in FIG. 1, to avoid the necessity of running wires to the door (or using so-called "power strikes", etc.) the circuitry is preferably battery powered. Battery power (and/or battery backup) can be used in jamb-mounted installations too, if desired to avoid wiring power to even the jamb.

In either case, to extend the life of the battery we prefer to cause the circuitry to be normally in a semidormant state—operating on extremely low power, or in a "slumbering" or "sleeping" mode. In this mode, adequate operating voltage effectively is applied to only a very small portion of the circuit—the portion needed to detect application of a key to the receptacle.

The first thing that happens when data are read from a key presented to the lock is that battery voltage is applied to the remainder of the circuit, in effect giving the device a "wake-up call".

As indicated by the chart of FIG. 3, the circuit must then test itself to determine whether it already stores a master code, or whether it is a virgin lock. If it finds that it is a virgin lock, the circuit stores the newly presented code in the first master location in the EEPROM.

The lock circuit then returns to its semidormant state, indicated on the diagram by "SNOZE". This procedure does not result in opening the lock; it only programs the master code into the lock.

Figure 4:
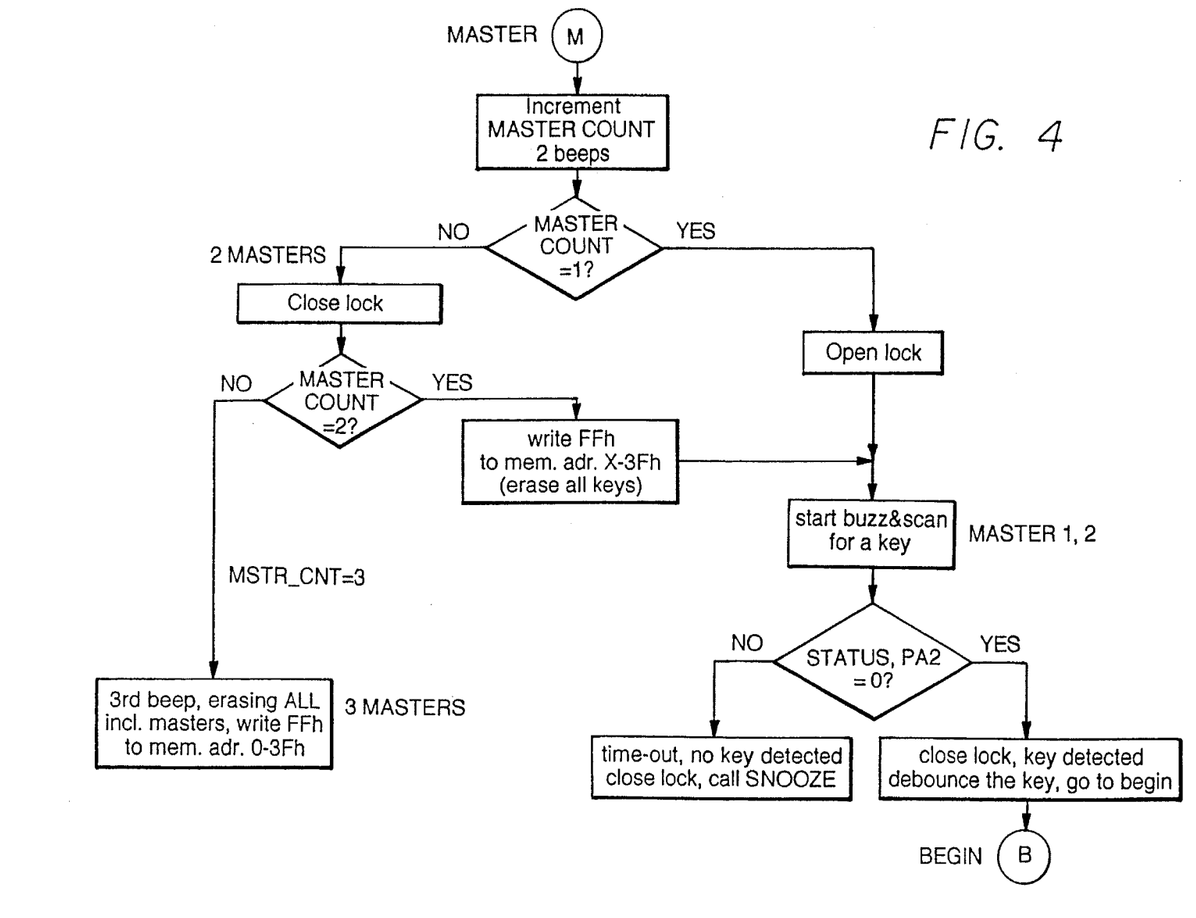
FIG. 4 is a flow chart indicating how the reception of a recognized master key code is acted upon by the ROM circuitry.

FIG. 4 is a flow chart indicating how the reception of a recognized master code is processed by the ROM circuitry. The circuit must count the number of times—as for example one, two, or three times—the key is presented to the lock within specified intervals.

If the key is presented only once, the lock opens and sounds, e.g., a continuous tone signal for five seconds by means of the indicator 45. If nothing else happens within the five seconds, the circuit goes back to sleep.

If, however, the key touches the lock a second time within the five seconds, all slave codes are erased from the EEPROM 30, and a tone is generated for an additional five seconds. If the key touches the lock yet again within that added five seconds, all master codes are also erased, and the lock again becomes (contrary to the customary semantics) a virgin lock.

The lock then through the output device 45 generates an output signal of three short tones with pauses between, indicating that all codes have been erased.

Figure 5:
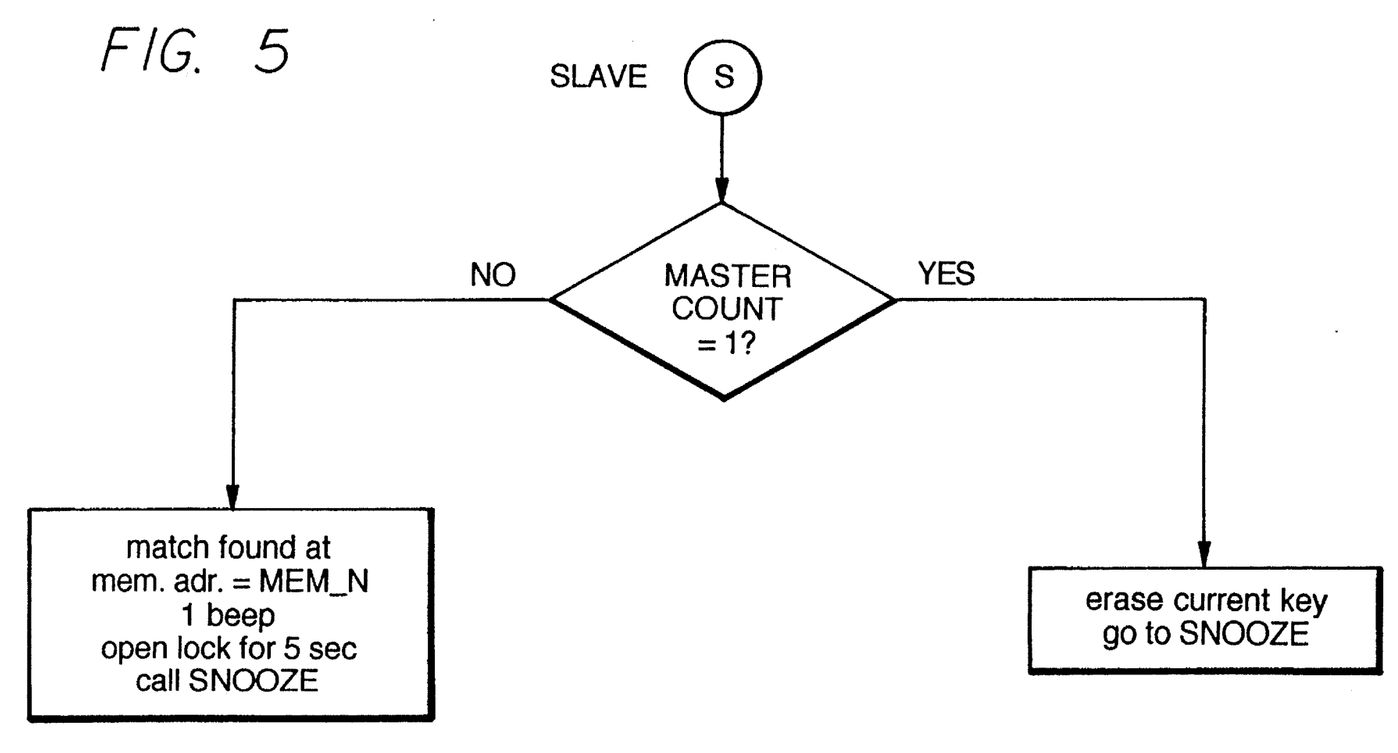
FIG. 5 is a flow chart indicating how the reception of a recognized slave key code is acted upon by the ROM circuitry.

FIG. 5 is a flow chart indicating how the reception of a recognized slave code is acted upon by the ROM circuitry. The circuit must first determine whether the recognized slave code was preceded by a master code within the allowable time period. If it was so preceded, then the slave code is erased from the EEPROM; but if the slave code appeared unaccompanied, then the lock is opened.

Figure 6:
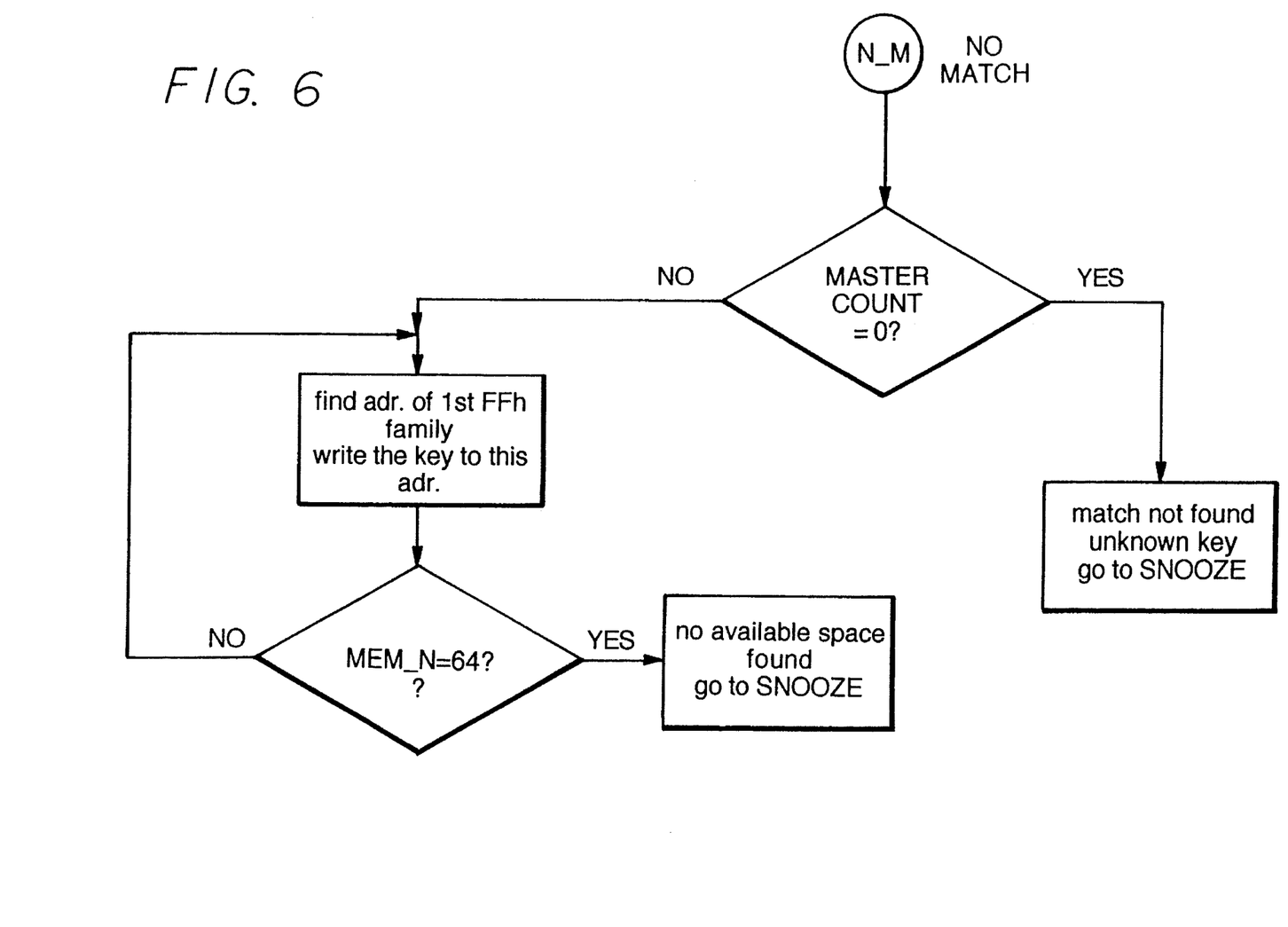
FIG. 6 is a flow chart indicating how an unacceptable key code is rejected by the lock circuit.

FIG. 6 is a flow chart indicating how an unacceptable code is rejected by the lock circuit. Here there are two possibilities, in either of which the lock circuit generates a series of three short tones, indicating nonacceptance:

If an unauthorized key is presented—for example, on the assumption that it is an authorized slave key when it is not—then that key must be rejected. If an attempt is being made to authorize a new slave code and an authorized master key is presented, but the slave locations of the EEPROM are already full, then the proposed additional key must be rejected.

Merely for definiteness the present embodiment is illustrated as having exactly two master locations. If preferred, however, our invention contemplates embodiments in which the apparatus instead includes three or more such locations.

Our invention, as previously mentioned, also contemplates embodiments in which the apparatus instead has a variable number of master locations, or permits any or certain specified locations to be used for either master or slave codes, etc.

Although a particular type of logic coding has been used, it will be understood by those skilled in the art that other and equivalent forms may be used which will provide either the same or an equivalent result with comparable circuitry.

OTHER ALTERNATIVE EMBODIMENTS

Several alternatives have already been described at various points in the foregoing text.

If desired, added security may be achieved by requiring a so-called "PIN number" (personal identification number), supplied through a keypad or other device, in addition to the key code of the key itself.

We prefer to maintain a separate inventory of the key codes (and PINs if any) that have been stored in the lock. The reason is that visual inspection of the lock yields no indication which key codes (or PINs), if any, have been programmed into it; or otherwise of what corresponding individuals are authorized to use the lock.

We prefer to use a separate computer to record some identification of the owner of each authorized key, and the memory address in EEPROM where the key code is installed. We prefer to record neither the key code itself nor the PIN (if any) in the separate computer: by virtue of this precaution, a person who has unauthorized access to the separate computer will still not be able to open the lock.

In order to carry out that method we prefer to couple the separate computer directly to the electronic lock, and to in essence maintain in the separate computer an image of all the addresses in the lock EEPROM and their usage. By "usage" is meant this information: (1) which address is occupied and which is not, and (2) what person's key code is in each of the occupied addresses.

In use, to enter a new key code in the lock EEPROM an operator:

uses the external computer to select an available address in the lock EEPROM;

enters (most typically by hand) into the selected address in the separate computer the name (or other desired data, or both) of the person to whom the associated key is assigned; and instructs the separate computer to communicate the selected address in the lock's EEPROM electronically to the lock and concurrently to receive the code from the key.

The user identification goes into the selected address in the computer but not in the lock; whereas the key code goes into the selected address in the lock but not in the computer.

For purposes of this document a somewhat specialized usage of a phrase "substantially unique" has already been introduced, with respect to key codes.

Analogously, while it is preferable to uniquely distinguish the several functions of the lock from one another by distinctive tone patterns, for some purposes use of patterns that are partially ambiguous is acceptable and in some cases even preferable. For example, a key can be rejected (1) as a potential new authorized key because the slave locations are all filled, or rejected (2) in the context of opening or not opening a lock because it is not an authorized key.

In such situations, because the different circumstances resolve the ambiguity for the operator, the same tone pattern can be used; and in other situations real ambiguity may be allowed to remain because it is of no consequence. Thus here too the phrase "substantially unique" encompasses provision of signals that are not literally unique but are sufficiently distinctive to render our invention fully practical in use.

A now-preferred form of the invention has been disclosed in considerable detail in order to comply with the patent laws, but it will be understood that the scope and extent of the invention is to be measured only in accordance with the appended claims.

What we claim as our invention:

1. A self-contained electronic lock comprising:

erasable circuit means for holding a plurality of electronic key codes in a plurality of corresponding address locations;

means associated with said erasable circuit means for identifying at least one of said plurality of address locations as a master key code address location, a master key code being a code that enables changing the contents of at least one of said plurality of address locations;

input means for communication with a key device to receive an electronic key code from said key device;

comparison means for comparing the received electronic key code with the contents of each of said plurality of address locations; and means responsive to said comparison means for performing predetermined lock-management functions which include the function of:

substantially entirely erasing the contents of said at least one master key code address location in response to receiving, in a master-code-erasing procedure, the master key code that is stored in said at least one master key code address location, so that at least one particular master key code address location becomes available for any key code from any key device that is subsequently in communication with the input means.

2. An electronic lock as in claim 1, wherein:

the lock-management functions further comprise opening or closing a lock; and said responsive means comprise means for opening or closing a lock.

3. An electronic lock as in claim 1, wherein:

the lock-management functions further comprise changing a physical state of a key switch; and said responsive means comprise means for changing a physical state of a key switch.

4. An electronic lock as in claim 1, wherein:

the erasable circuit means comprise a nonvolatile memory;

the lock-management functions further comprise validating or invalidating another key by physically changing the contents of the nonvolatile memory; and said responsive means comprise means for validating or invalidating another key by physically changing the contents of the nonvolatile memory.

5. The electronic lock of claim 1, further comprising:

verification means, operable in conjunction with performance of the predetermined lock-management function, for generating an intelligence signal that substantially uniquely identifies the particular lock-management function performed.

6. The electronic lock of claim 5, wherein:

the verification means are operable in response to performance of the predetermined lock-management function.

7. The lock of claim 1, wherein:

the identifying means identify at least two of said plurality of address locations as master key code address locations;

the entirely-erasing function comprises substantially entirely erasing the contents of every master key code address location, so that all said master key code address locations become available for any key code; and said responsive means comprise means for substantially entirely erasing the contents of every master key code address location in response to receiving, in said master-code-erasing procedure, of a master key code stored in any master key code address location.

8. The lock of claim 7, wherein:

said lock-management functions further comprise the function of validating the received key code as a new master key code;

said validating is initiated independently of what key code is received;

said comparison means further comprise means for determining whether every master key code address location is available for a key code; and said responsive means comprise means for validating the received key code as a new master key code in response to determination by the comparison means that every master key code address location is available for a key code, and regardless of what key code is received.

9. The lock of claim 8, wherein:

said validating function validates substantially any received key code as said new master key code.

10. The lock of claim 7, wherein:

said lock-management functions further include the function of validating a new master key code;

said validating is initiated independently of what key code is received;

said comparison means further comprise means for determining whether at least one master key code address location is available for a key code; and said responsive means comprise means for performing said validating function in response to determination by the comparison means that at least one master key code address location is available for a key code, and regardless of what key code is received.

11. The lock of claim 7, wherein:

said master-code-erasing procedure comprises receiving a single master key code a particular number of times in succession.

12. The lock of claim 11, wherein:

said specified number of times is three times.

13. The lock of claim 1, further comprising:

means for defining the master-code-erasing procedure;

means for determining whether the master-code-erasing procedure has been completed; and means, sensitive to determination by the determining means that the master-code-erasing procedure has not been completed, for inhibiting performance of said substantially-entirely-erasing function by said responsive means.

14. The lock of claim 13, wherein:

the procedure-defining means comprise means for defining a plurality of procedures to initiate performance of said predetermined lock-management functions, respectively;

the determining means comprise means for determining whether one procedure, of the plurality of procedures, has been completed; and if so, then the responsive means perform a lock-management function corresponding to said one completed procedure; and, if not, then the responsive means perform none of the lock management functions.

15. An electronic lock comprising:

an EEPROM for holding a plurality of electronic key codes in a plurality of corresponding address locations;

means, associated with said EEPROM, for identifying at least one of said plurality of address locations as a master key code address and for identifying at least two of said plurality of address locations as slave key code addresses; a master key code being a code that enables changing the contents of at least one of said plurality of address locations, and a slave key code being a code that enables unlocking the lock;

input means for communication with a key device to receive and temporarily store an electronic key code from said key device;

comparison means for comparing a received electronic key code with the contents of each of said plurality of address locations to determine whether the received key code corresponds to a key code stored in any of said plurality of address locations; and means, responsive to said comparison means, for performing predetermined lock-management functions which include the function of:

substantially entirely erasing the contents of said at least one master key code address location in response to receiving, in a master-code-erasing procedure, the master key code that is stored in said at least one master key code address location, so that at least one particular master key code address location becomes available for any key code from any key device that is subsequently in communication with the input means.

16. The electronic lock of claim 15, wherein:

the predetermined lock-management function comprises validating a master key if at least one of the master key code address locations is available for a master key code address, and not validating a master key if there is not at least one master key code address location available for a master key code address; and the performing means comprise means for validating a master key if at least one of the master key code address locations is available for a master key code address, and not validating a master key if there is not at least one master key code address location available for a master key code address.

17. The electronic lock of claim 15, wherein:

the identifying means comprise means for identifying a plurality of the address locations as master key code locations;

the predetermined lock-management function comprises validating a master key if any of the master key code address locations is available for a master key code address, and not validating a master key if there is not at least one master key code address location available for a master key code address; and the performing means comprise means for validating a master key if any of the master key code address locations is available for a master key code address, and not validating a master key if there is not at least one master key code address location available for a master key code address.

18. The electronic lock of claim 15, further comprising:

verification means, operable in conjunction with the performance of the predetermined lock-management function, for generating an intelligence signal that substantially uniquely identifies the particular lock-management function that has been performed.

19. The electronic lock of claim 15, wherein:

the input means comprise means for effectuating said receiving and temporarily storing in response to an input-device/key communication that is momentary.

20. The electronic lock of claim 15, wherein:

the input means comprise means for effectuating said receiving and temporarily storing in response to an input-device/key communication that is protracted.

21. The electronic lock of claim 20, wherein:

the performing means comprise means for enabling a function selected from the group consisting of:

operation of a vehicle, heavy equipment, safety equipment, a communication system, or a computer system; and access to an enclosure containing physically valuable articles.

22. A method of operating an electronic lock system that includes (1) an electronic lock having an erasable memory for storing a set of key codes, said memory including at least one erasable memory location reserved for a master key code, and (2) a plurality of electronic keys each of which holds a substantially unique key code and each of which is for selective engagement and electrical communication with the lock; said method being such as to designate any selected one of the keys as a master key; a master key being a key that enables changing the contents of at least one of said plurality of address locations; said method comprising the steps of:

manually selecting a key and manually engaging the selected key with the lock; and in response to that engagement of the selected key with the lock:

substantially automatically determining whether at least one particular erasable memory location reserved for a master key code is empty, and in response to determining that at least one particular erasable memory location is empty, and no matter what key code said selected key has, substantially automatically storing the key code of said selected key in said particular erasable memory location, to identify the thus-stored key code as belonging to a master key.

23. The method of claim 22, further comprising the additional step of:

in conjunction with performance of the automatically-determining and automatically-storing steps, verifying the performance of the automatically-storing step by generating an intelligence signal that substantially uniquely identifies the automatically-storing step.

24. A method of operating an electronic lock system that includes an electronic lock having an erasable memory for storing a set of key codes, and that includes a plurality of electronic keys each of which contains a substantially unique key code and each of which is for selective engagement and electrical communication with the lock; said method being a method of operating the lock system so as to designate a selected key as a master key; a master key code being a code that enables changing the contents of at least one key code in said stored set of key codes; said method comprising the steps of:

substantially automatically selecting a key code location in the erasable memory;

if said selected key code location is not already reserved for a master key code, substantially automatically reserving said selected key code location for a master key code; but if said selected key code location is already reserved for a master key code, then not performing said substantially automatically reserving step;

manually selecting a key;

manually engaging the selected key with the lock; and in response to the manually-engaging step:

substantially automatically determining whether said selected key code location in the erasable memory is empty, and in response to a determination that said selected key code location in the erasable memory is empty, and no matter what key code the selected key has, substantially automatically storing the key code of the selected key in said selected master key code memory location, as a master key code.

25. The method of claim 24, wherein:

before said key-engaging step, a master key code that is different from the key code of said selected key is already stored in a location, in the erasable memory, that is different from said selected master key code memory location.

26. The method of claim 24, wherein:

in conjunction with said automatically-storing step, verifying the performance of said automatically-storing step by generating an intelligence signal that substantially uniquely identifies the performance of said automatically-storing step.

27. A method of operating an electronic lock system that includes an electronic lock having an erasable memory for storing a set of key codes, including at least one memory location reserved substantially automatically for a master key code, and that includes a plurality of electronic keys each of which contains a substantially unique key code and each of which is for selective engagement and electrical communication with the lock; said method being a method of operating the lock system so as to designate a selected key as a master key; a master key code being a code that enables changing the contents of at least one key code in said stored set of key codes; said method comprising the steps of:

substantially automatically selecting a master key code memory location in the erasable memory;

manually selecting a key;

manually engaging the selected key with the lock; and in response to the manually-engaging step:

substantially automatically determining whether said selected master key code memory location is empty, in response to a determination that said selected master key code memory location is empty, and no matter what key code the selected key has, substantially automatically storing the key code of the selected key in said selected master key code memory location.

28. A method of operating an electronic lock system that includes an electronic lock having an erasable memory for temporarily storing a set of key codes, and that includes a plurality of electronic keys each of which contains a substantially unique key code and each of which is for selective engagement and electronic communication with the lock, and in which the key code of a particular key has already been stored in a memory location reserved for a master key code; said method being a method of operating the lock system so as to change from that particular key to a selected new master key; a master key code being a code that enables changing the contents of at least one key code in said stored set of key codes; said method comprising the steps of:

manually engaging the particular key with the lock at least three separate times in uninterrupted sequence within a predetermined time interval;

in response to the sequence of engagements by the particular key, substantially automatically erasing the key code of the particular key from the memory location reserved for a master key code;

then manually selecting any key to become the new master key;

thereafter, manually engaging the selected key with the lock; and in response to said manually-engaging step, substantially automatically storing the key code of the selected key in said memory location reserved for a master key code, so that the selected key becomes the new master key.

29. An electronic lock for selectively utilizing an electronic key device, which contains a substantially unique key code, as either a slave key or a master key; a slave key being a key that enables unlocking the lock, and a master key being a key that enables changing designations of what key devices the lock will recognize as slave and master keys; said lock comprising:

an EEPROM having a plurality of separate address locations for holding a corresponding plurality of electronic key codes, at least one of said address locations being identified as a master key code address and a plurality of other said address locations being identified as slave key code addresses;

volatile memory means for accepting and temporarily holding an electronic key code;

input means for communication with an electronic key device and for receiving therefrom during said communication a key code substantially unique to said key device, and for temporarily storing the received key code in said volatile memory means;

comparison means for comparing the received and temporarily stored key code with the contents of each of said plurality of address locations to determine whether the received and temporarily stored key code is in any of said plurality of address locations;

means, responsive to a determination by said comparison means that the received and temporarily stored key code is in any of said plurality of address locations, for generating a lock-unlocking signal;

means for automatically determining whether all of said address locations are empty;

means for responding to a determination by the determining means that all of said address locations are empty by placing the received and temporarily stored code in a master code address, no matter what that code is, whereby said key device becomes a master key; and verification means for generating, in conjunction with said placing of said key code by said responding means, an intelligence signal identifying storage of a master key code.

30. A self-contained electronic lock comprising:

erasable circuit means for holding electronic key codes in address locations;

means for identifying at least one of the address locations as a master key code address location, a master key code being a code that enables changing the contents of at least one of said address locations;

input means for communication with a key device to receive an electronic key code from said key device; and comparison means for comparing the received electronic key code with the contents of said address locations and in response thereto performing predetermined lock-management functions; and wherein at a particular time:

said input means are not in communication with any such key device;

said comparison and function-performing means are not active; and every master key code address location is substantially empty and available for any key code from any key device that is subsequently in communication with the input means.

31. A self-contained electronic lock comprising:

erasable circuit means for holding electronic key codes in address locations;

means for identifying a particular address location, of said address locations, as a master key code address for a master key code; said master key code being a code that enables changing the contents of at least one of said address locations;

input means for communication with a key device to receive an electronic key code from said key device; and means responsive to the received electronic key code for erasing the contents of the master key code address location, on the authority of the received key code if said received key code is in the master key code address location, without resort to higher authority.

* * * * *